US010722793B2

United States Patent
Paradise et al.

(10) Patent No.: US 10,722,793 B2
(45) Date of Patent: Jul. 28, 2020

(54) SYNCHRONIZATION MODEL FOR VIRTUAL TOURNAMENTS

(71) Applicant: Skillz Inc., San Francisco, CA (US)

(72) Inventors: Andrew Paradise, San Francisco, CA (US); Miriam Aguirre, Oakland, CA (US)

(73) Assignee: Skillz Inc, San Francisco, CA (US)

( * ) Notice: Subject to any disclaimer, the term of this patent is extended or adjusted under 35 U.S.C. 154(b) by 0 days.

(21) Appl. No.: 15/459,321

(22) Filed: Mar. 15, 2017

(65) Prior Publication Data

US 2017/0266552 A1    Sep. 21, 2017

Related U.S. Application Data (60) Provisional application No. 62/308,812, filed on Mar. 15, 2016.

(51) Int. Cl.
*A63F 13/44*  (2014.01)
*A63F 13/798* (2014.01)
(Continued)

(52) U.S. Cl.
CPC .............. *A63F 13/44* (2014.09); *A63F 13/32* (2014.09); *A63F 13/332* (2014.09); *A63F 13/34* (2014.09);
(Continued)

(58) Field of Classification Search
CPC .......... A63F 13/12; A63F 13/34; A63F 13/35; A63F 13/44; A63F 13/48; A63F 13/798
See application file for complete search history.

(56) References Cited

U.S. PATENT DOCUMENTS

| 5,411,258 A | 5/1995 | Wilson et al. |
| 6,443,841 B1 | 9/2002 | Rossides |

(Continued)

FOREIGN PATENT DOCUMENTS

| CN | 103945912 A | 7/2014 |
| EP | 1684228 A1 | 7/2006 |

(Continued)

OTHER PUBLICATIONS

Dreef et al., Measuring skill in games: several approaches discussed. Mathematical Methods of Operations Research. 2004;59(3):375-91.

(Continued)

*Primary Examiner* — David L Lewis
*Assistant Examiner* — Robert E Mosser
(74) *Attorney, Agent, or Firm* — Mintz Levin Cohn Ferris Glovsky and Popeo, P.C.

(57) ABSTRACT

Data characterizing two players enrolled in a tournament of an online video game is received. Each player is executing a separate instance of the online video game. The online video game is asynchronous between the two players. The data is received by a tournament server hosting the tournament and separate from a game server providing game data to clients associated with the two players. An instruction for synchronous initiation of gameplay between the two players is generated. The instruction is transmitted to the clients associated with the two players, the instruction causing synchronous initiation of the asynchronous games for the two players. Related apparatus, systems, techniques and articles are also described.

22 Claims, 7 Drawing Sheets

(51) Int. Cl.
    *A63F 13/48*           (2014.01)
    *A63F 13/86*           (2014.01)
    *A63F 13/32*           (2014.01)
    *A63F 13/332*          (2014.01)
    *A63F 13/34*           (2014.01)
    *A63F 13/352*          (2014.01)

(52) U.S. Cl.
    CPC ............ *A63F 13/352* (2014.09); *A63F 13/48* (2014.09); *A63F 13/798* (2014.09); *A63F 13/86* (2014.09)

(56) References Cited

U.S. PATENT DOCUMENTS

| | | |
|---|---|---|
| 6,676,517 B2 | 1/2004 | Beavers |
| 6,699,127 B1 | 3/2004 | Lobb et al. |
| 6,856,986 B1 | 2/2005 | Rossides |
| 8,088,000 B2 | 1/2012 | Ginsberg et al. |
| 8,210,926 B2 | 7/2012 | Asher et al. |
| 8,313,368 B2 | 11/2012 | Filipour et al. |
| 8,360,873 B1 | 1/2013 | Wickett et al. |
| 8,414,387 B2 | 4/2013 | Paradise et al. |
| 8,485,899 B1 | 7/2013 | Rom et al. |
| 8,512,129 B2 | 8/2013 | Ginsberg et al. |
| 8,545,330 B2 | 10/2013 | Wickett et al. |
| 8,562,422 B2 | 10/2013 | Lutnick |
| 8,568,222 B2 | 10/2013 | Gagner et al. |
| 8,613,662 B2 | 12/2013 | Morrow et al. |
| 8,641,511 B2 | 2/2014 | Ginsberg et al. |
| 8,651,948 B2 | 2/2014 | Asher et al. |
| 8,683,272 B2 | 3/2014 | Cadima et al. |
| 8,715,077 B2 | 5/2014 | Paradise et al. |
| 8,790,170 B2 | 7/2014 | Arnone et al. |
| 8,882,576 B1 | 11/2014 | Paradise et al. |
| 8,900,054 B2 | 12/2014 | Patel |
| 8,926,435 B2 | 1/2015 | Perry et al. |
| 9,240,101 B2 | 1/2016 | Paradise et al. |
| 9,349,246 B1 | 5/2016 | Paradise et al. |
| 9,446,315 B2 | 9/2016 | Paradise et al. |
| 9,479,602 B1 | 10/2016 | Paradise et al. |
| 9,630,097 B2 | 4/2017 | Paradise et al. |
| 9,649,564 B2 | 5/2017 | Paradise et al. |
| 9,697,680 B2 | 7/2017 | Paradise et al. |
| 9,767,644 B2 | 9/2017 | Paradise et al. |
| 2001/0031663 A1 | 10/2001 | Johnson |
| 2001/0044339 A1* | 11/2001 | Cordero ................. A63F 13/12 463/42 |
| 2002/0037767 A1 | 3/2002 | Ebin |
| 2002/0073021 A1 | 6/2002 | Ginsberg et al. |
| 2002/0160824 A1 | 10/2002 | Goto et al. |
| 2004/0204217 A1 | 10/2004 | Herman |
| 2005/0043089 A1 | 2/2005 | Nguyen et al. |
| 2005/0090307 A1 | 4/2005 | Walker et al. |
| 2006/0058103 A1 | 3/2006 | Danieli et al. |
| 2006/0080175 A1 | 4/2006 | Rowe et al. |
| 2006/0098013 A1 | 5/2006 | Wong et al. |
| 2006/0189382 A1 | 8/2006 | Muir et al. |
| 2007/0004509 A1 | 1/2007 | Banton |
| 2007/0026934 A1 | 2/2007 | Herbrich et al. |
| 2007/0037623 A1 | 2/2007 | Romik |
| 2007/0072676 A1 | 3/2007 | Baluja |
| 2007/0136817 A1 | 6/2007 | Nguyen |
| 2007/0191101 A1 | 8/2007 | Coliz et al. |
| 2007/0265092 A1 | 11/2007 | Betteridge |
| 2008/0033734 A1 | 2/2008 | Carry |
| 2008/0108438 A1* | 5/2008 | Sugiyama ............... A63F 13/12 463/42 |
| 2008/0153588 A1 | 6/2008 | Muir et al. |
| 2008/0161113 A1 | 7/2008 | Hansen et al. |
| 2008/0200242 A1 | 8/2008 | Ginsberg et al. |
| 2008/0201159 A1 | 8/2008 | Gabrick et al. |
| 2008/0207327 A1 | 8/2008 | Van Luchene et al. |
| 2008/0214301 A1 | 9/2008 | Sandige et al. |
| 2008/0234047 A1 | 9/2008 | Nguyen |
| 2008/0268961 A1 | 10/2008 | Brook et al. |
| 2008/0287183 A1 | 11/2008 | Reeves, III |
| 2009/0048010 A1 | 2/2009 | Kroeckel et al. |
| 2009/0099924 A1 | 4/2009 | Lensch et al. |
| 2009/0131177 A1 | 5/2009 | Pearce |
| 2009/0170608 A1 | 7/2009 | Herrmann et al. |
| 2009/0197665 A1 | 8/2009 | Christensen |
| 2009/0208181 A1 | 8/2009 | Cottrell |
| 2009/0209350 A1 | 8/2009 | Kelly et al. |
| 2009/0215540 A1 | 8/2009 | Perlman et al. |
| 2009/0227313 A1 | 9/2009 | Minka et al. |
| 2009/0325709 A1 | 12/2009 | Shi |
| 2010/0022307 A1 | 1/2010 | Steuer et al. |
| 2010/0144426 A1 | 6/2010 | Winner et al. |
| 2010/0166062 A1 | 7/2010 | Perlman et al. |
| 2010/0216536 A1 | 8/2010 | Gagner et al. |
| 2010/0222124 A1 | 9/2010 | Goshen |
| 2010/0234101 A1 | 9/2010 | Morrow et al. |
| 2010/0241699 A1 | 9/2010 | Muthukumarasamy et al. |
| 2010/0304860 A1 | 12/2010 | Gault et al. |
| 2010/0311496 A1 | 12/2010 | Taylor et al. |
| 2011/0010386 A1 | 1/2011 | Zeinfeld |
| 2011/0072056 A1 | 3/2011 | Bakalash et al. |
| 2011/0130197 A1 | 6/2011 | Bytnar et al. |
| 2011/0212766 A1 | 9/2011 | Bowers et al. |
| 2011/0254223 A1 | 10/2011 | Valentine |
| 2011/0281645 A1 | 11/2011 | Wolfson et al. |
| 2011/0300949 A1 | 12/2011 | Filipour et al. |
| 2012/0004039 A1 | 1/2012 | Perry et al. |
| 2012/0013622 A1 | 1/2012 | Mahajan et al. |
| 2012/0028718 A1 | 2/2012 | Barclay et al. |
| 2012/0100918 A1 | 4/2012 | Ginsberg et al. |
| 2012/0122553 A1 | 5/2012 | Bunch et al. |
| 2012/0156668 A1 | 6/2012 | Zelin |
| 2012/0178514 A1 | 7/2012 | Schulzke et al. |
| 2012/0196687 A1 | 8/2012 | Graham et al. |
| 2012/0252579 A1 | 10/2012 | Sethi et al. |
| 2012/0281080 A1 | 11/2012 | Wang |
| 2013/0029760 A1 | 1/2013 | Wickett et al. |
| 2013/0079072 A1 | 3/2013 | Filipour et al. |
| 2013/0121614 A1 | 5/2013 | Intwala |
| 2013/0151614 A1 | 6/2013 | Beerse et al. |
| 2013/0165196 A1 | 6/2013 | Kroeckel et al. |
| 2013/0172086 A1 | 7/2013 | Ikenaga |
| 2013/0179798 A1 | 7/2013 | Korupolu et al. |
| 2013/0217482 A1 | 8/2013 | Kelly et al. |
| 2013/0226983 A1 | 8/2013 | Beining et al. |
| 2013/0273987 A1 | 10/2013 | Laycock et al. |
| 2013/0331177 A1 | 12/2013 | Arnone et al. |
| 2013/0339473 A1 | 12/2013 | McCaffrey et al. |
| 2013/0344960 A1 | 12/2013 | Perry et al. |
| 2013/0344963 A1 | 12/2013 | Gupta et al. |
| 2014/0024427 A1 | 1/2014 | Cole et al. |
| 2014/0024437 A1 | 1/2014 | Vann et al. |
| 2014/0031132 A1 | 1/2014 | Wickett et al. |
| 2014/0045589 A1 | 2/2014 | Paradise et al. |
| 2014/0094267 A1 | 4/2014 | Davis et al. |
| 2014/0100023 A1 | 4/2014 | Arnone et al. |
| 2014/0128147 A1 | 5/2014 | Yu Cheng et al. |
| 2014/0194188 A1 | 7/2014 | Kosta et al. |
| 2014/0200062 A1 | 7/2014 | Paradise et al. |
| 2014/0323199 A1 | 10/2014 | DiMichele et al. |
| 2014/0323204 A1 | 10/2014 | Paradise et al. |
| 2015/0024839 A1 | 1/2015 | Zahn et al. |
| 2015/0065226 A1 | 3/2015 | Paradise et al. |
| 2015/0121437 A1* | 4/2015 | Tan .................... H04N 21/2187 725/93 |
| 2015/0202529 A1 | 7/2015 | Paradise et al. |
| 2016/0055710 A1 | 2/2016 | Paradise et al. |
| 2016/0110960 A1 | 4/2016 | Paradise et al. |
| 2016/0253866 A1 | 9/2016 | Paradise et al. |
| 2017/0225075 A1 | 8/2017 | Paradise et al. |
| 2017/0249802 A1 | 8/2017 | Paradise et al. |

(56) References Cited

U.S. PATENT DOCUMENTS

2017/0266549 A1    9/2017  Paradise
2017/0270751 A1    9/2017  Paradise

FOREIGN PATENT DOCUMENTS

| EP | 1738810 A1 | 1/2007 |
| EP | 2695650 A1 | 2/2014 |
| JP | 2003144745 A | 5/2003 |
| KR | 20000018932 A | 4/2000 |
| WO | WO-2011149564 A1 | 12/2011 |

OTHER PUBLICATIONS

Fiedler et al., Quantifying Skill in Games—Theory and Empirical Evidence for Poker. Gaming Law Review and Economics. 2009;13(1):50-7.
International Preliminary Report on Patentability and Written Opinion issued in Int'l Application No. PCT/US2014/035876 dated Nov. 12, 2015.
International Search Report issued in Int'l Application No. PCT/US2014/035876 dated Oct. 17, 2014.
International Search Report and Written Opinion for Application No. PCT/US2017/022423 dated Nov. 8, 2017.
International Search Report and Written Opinion for Application No. PCT/US2017/022412 dated Jun. 16, 2017.
International Search Report and Written Opinion for Application No. PCT/US2017/022440 dated Jun. 6, 2017.

* cited by examiner

FIG. 7

SYNCHRONIZATION MODEL FOR VIRTUAL TOURNAMENTS

CROSS REFERENCE TO RELATED APPLICATION

This application claims priority under 35 U.S.C. § 119(e) to U.S. Provisional Patent Application No. 62/308,812 filed Mar. 15, 2016, the entire contents of which is hereby incorporated by reference herein.

TECHNICAL FIELD

The subject matter described herein relates to creation and hosting of digital online video game tournament on an ad-hoc basis.

BACKGROUND

Video game streamers engage with their audience by showing live footage of their gameplay. Streamers are currently limited in their ability to engage with their audience because there is no universal solution that allows streamers to host interactive, live, competitive content for their viewers.

SUMMARY

In an aspect, data characterizing two players enrolled in a tournament of an online video game is received. Each player is executing a separate instance of the online video game. The online video game is asynchronous between the two players. The data is received by a tournament server hosting the tournament and separate from a game server providing game data to clients associated with the two players. An instruction for synchronous initiation of gameplay between the two players is generated. The instruction is transmitted to the clients associated with the two players, the instruction causing synchronous initiation of the asynchronous games for the two players.

One or more of the following features can be included in any feasible combination. For example, the instruction can cause gameplay to initiate when received by the client. Each client can include a game instance and a peer-tournament module that receives the instruction and causes gameplay to initiate in response to receiving the instruction by executing a launch-game callback with the game instance. Each client can include a game instance and a peer-tournament module that receives the instruction and, in response to receiving the instruction, transmits a second instruction to the game server to cause initiation of communication of game data from the game server to the game instance.

The instruction can specify a time for game initiation. Each client can include a game instance and a peer-to-peer module that receives the instruction and causes the game to initiate at the specified time by executing a launch-game callback with the game instance. Each client can include a game instance and a peer-to-peer module that receives the instruction and, at the specified time to initiate, transmits a second instruction to the game server to cause initiation of communication of game data from the game server to the game instance.

A match identifier, a player identifier, and game parameters can be transmitted to each client. The match identifier can specify a unique identifier to the tournament. The player identifier can be a unique identifier for a user's entry in the tournament. The game parameters can include data for configuring each game instance to execute.

Simultaneous video streaming of gameplay for side-by-side viewing by a viewing client can be enabled.

The current subject matter can include a tool that allows for streamers (e.g., "event hosts") to create and host a tournament in any mobile game on an ad-hoc basis; viewers to join into a competition that is either privately created for the streamer's audience or that is public to all players of the game; and events to be hosted in a manner optimized for engagement and competitive play for any audience.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter includes a tool that allows for streamers (e.g., "event hosts") to create and host a tournament in any mobile game on an ad-hoc basis; viewers to join into a competition that is either privately created for the streamer's audience or that is public to all players of the game; and events to be hosted in a manner optimized for engagement and competitive play for any audience.

In some implementations, the current subject matter can enable synchronizing of otherwise asynchronous games to enable a live tournament. An asynchronous game includes a game where gameplay of two competitors is not necessarily performed at the same time. For example, two players each playing a single player game results in asynchronous gameplay. The current subject matter can include a server that synchronizes an asynchronous game such that two (or more) players begin play substantially simultaneously. This enables a live tournament, including streaming of each player's gameplay and real-time comparison between players. Such comparison may be performed, for example, as part of an eSports tournament.

In some implementations, streamers can create and host a tournament in any mobile game on an ad-hoc basis. Streamers are able to sign up with an account and access an events web portal. Using this portal, streamers may create an event to host and display on their streaming page. Options for the streamer to set prior to the event include: date and time of event; description of the event; number of participants in the event; prize money given out to event winners; entry fee (if any) to the event; game in which the event will be played; seeding type; round time limit; and tiebreaker time limit. The tournaments are referred to as "bracketed events" because they fit the format of a single elimination bracket commonly found in athletic completion.

Viewers can join into a competition that is either privately created for the streamer's audience or that is public to all players of the game. Tournament lobby and access to event streaming logic allows the streamer to engage two groups of users: (1) his or her current audience and viewers and (2) users who are not familiar with the streamer but are actively playing the game.

For the first group viewers are able to easily download and play the game via automatically generated instructions that are placed on the streamer's display. From within the game the new player's may enter a match code included with the auto-generated instructions. This match code allows users to sign up for events, purchase entry tickets if necessary, and compete against other viewers.

The event host has the option to include or exclude the second group of users, the players who are actively playing the game. If included, these players will see the option to join the tournament from the in game menu. This will not only include the ability to register for the tournament if space is still available but will also include directions to view the event broadcast with a link to the streamer's page.

Events can be hosted in a manner optimized for engagement and competitive play for any audience. The event host can stream using a streaming management server. The stream and event are optimized to increase engagement and competitive play by setting a structure that reduces downtime and maximizes potential for an exciting bracket structure.

In a first round players are seeded against one another by matching competitors of similar skill levels. This ensures an exciting and engaging first round that draws users into the competition even in the event of a loss. Rounds are then synchronized to start simultaneously for all players so that, despite asynchronous gameplay, competitors play against each other at the same time. Competitor's receive notifications and updates about their individual performance and advancement through the bracket on their own device. Alternatively players, even if eliminated from the tournament, may follow the tournament progress in real time via the event stream.

Figure 1:
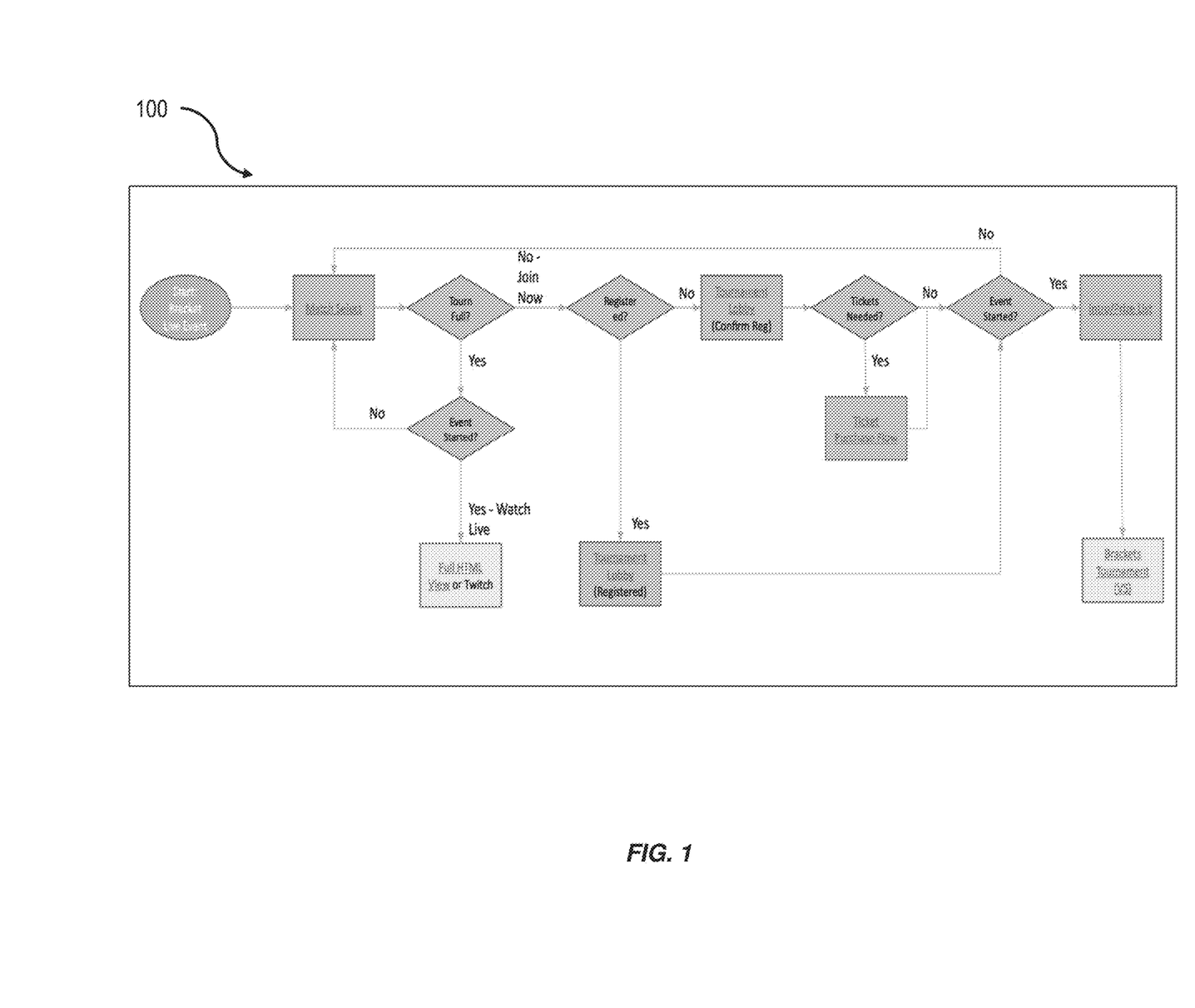
FIG. 1 is a process flow diagram illustrating a process enabling a tournament lobby and player access to event streaming.

FIG. 1 is a process flow diagram illustrating a process 100 enabling a tournament lobby and player access to event streaming. The event may be joined via a peer-tournament module described further below with reference to FIG. 2. The peer-tournament module can be implemented by game developers using a software development kit (SDK) associated with a tournament server. When a user selects to enter the tournament, a server verifies whether there is room available in the tournament based on the current number of registered users and the number of participants specified by the event host. If there is a spot available the user is moved forward to registration, otherwise the user is informed that the tournament is full and is provided with information on where to view the event stream.

For an event with an entry fee, the user will be prompted to purchase a ticket for the event as part of the registration. In the case of a free event, a user can be registered by confirming that they would like to enter the tournament. Once registered, a user is brought back to a home page until the event has begun.

Once the event has begun all registered users can be notified that the first round is beginning. Subsequent rounds will follow the same logic as bracketed tournaments.

Figure 4:
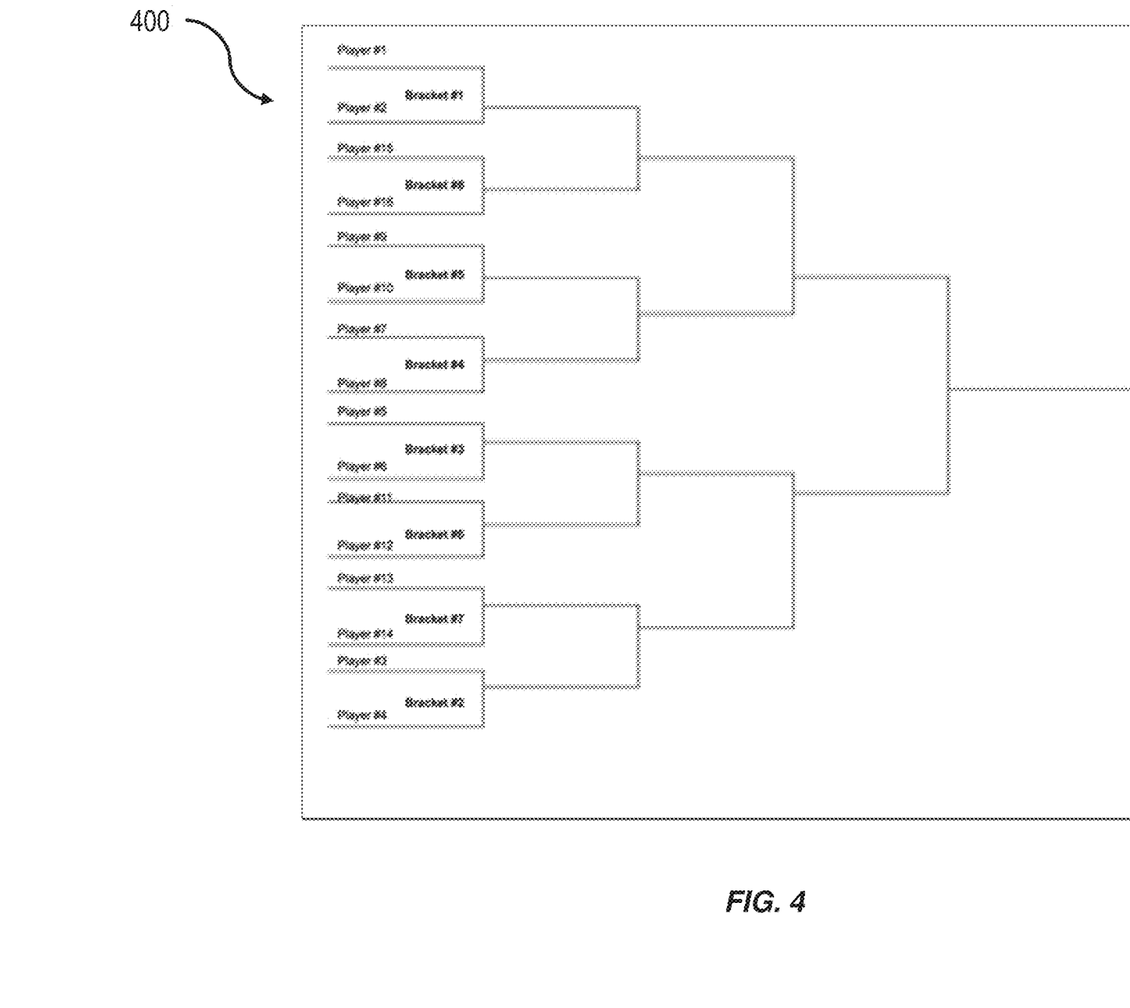
FIG. 4 illustrates an example tournament bracket.

FIG. 4 illustrates an example bracket 400. Smart seeding places competitors in the optimal match-ups to increase engagement of the players and maximize viewership excitement. This feature uses a database and a determination of a player's game skill factor to generate a bracket that maximizes the likelihood of both close matches and surprising upsets.

Smart seeding follows the below process (example is specific to a 16 player tournament but will fit a tournament of with any number of participants). Stack rank all the players based on rating, and pair #1 with #2, #3 with #4, and the like. Then seed each bracket pairing, where Bracket #1 is the Player #1 vs Player #2 game, Bracket #2 is the Player #3 vs Player #4 game, and the like. Then use standard seeding methods for each Bracket, so the Bracket #1 (#1 vs #2) will be on opposite sides of the bracket as the Bracket #2 (#3 vs #4).

Bracket Seed #1=Player Seed #1 vs #2
Bracket Seed #2=Player Seed #3 vs #4
Bracket Seed #3=Player Seed #5 vs #6
Bracket Seed #4=Player Seed #7 vs #8
Bracket Seed #5=Player Seed #9 vs #10
Bracket Seed #6=Player Seed #11 vs #12
Bracket Seed #7=Player Seed #13 vs #14
Bracket Seed #8=Player Seed #15 vs #16

Figure 2:
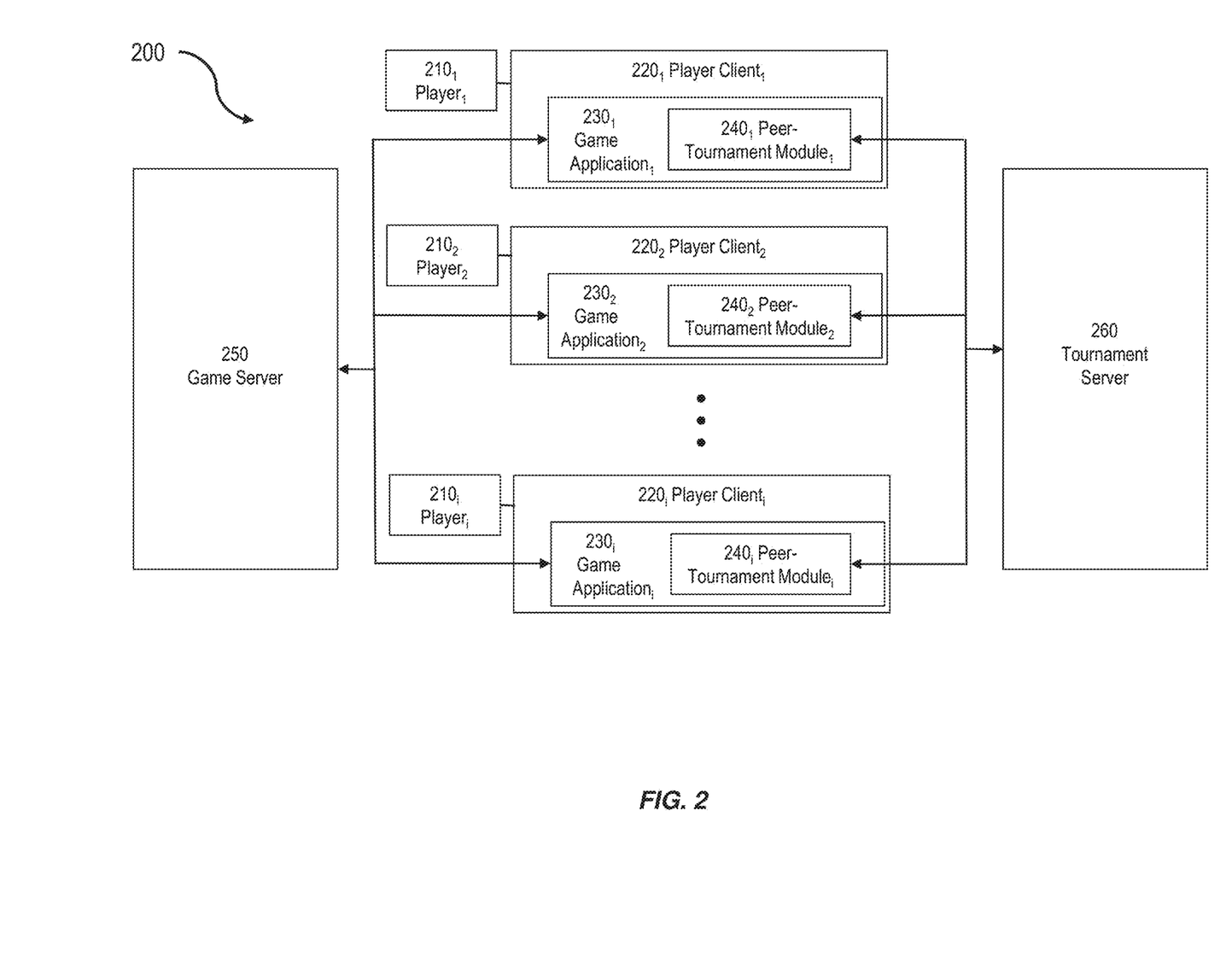
FIG. 2 is a system block diagram illustrating an example system for implementing a peer-to-peer digital gaming tournament.

FIG. 2 is a system block diagram illustrating an example system 200 for implementing a peer-to-peer digital gaming tournament. The system 200 includes a tournament server 260 that enables tournament play between players of a game.

A plurality of players $210_i$ (i=1, 2, . . . , N) operate respective player clients $220_i$. Each player client $220_i$, includes a third party game application $230_i$. The game application $230_i$, can be any online digital game (e.g., video game). In some implementations, multiple players $210_i$ can compete against one another online. Games can be consistent across game applications $230_i$ (e.g., if the players $210_i$ are playing chess, each game application $230_i$ is an instance of an electronic chess game). Each game application 230 can be in communication with and receiving game data from a game server 250. The game server 250 provides game data necessary to operate the game. The game server 250 can be a third party game server, e.g., separate from the tournament server 260 and with limited accessibility by the tournament server 260 (e.g., the tournament server 260 has either no communication or limited API call access to the game server). Player clients 220 may include mobile devices (e.g., smartphones, tablets, and the like), and the player clients 220, game server 250, and tournament server 260 can implement the tournament over a network, such as the internet.

Each game application 230 includes a peer-tournament module $240_i$. Peer-tournament module 240 integrates into game application 230 and enables players 210 to enroll and participate in an online game competition. Peer-tournament module 240 communicates with and works in tandem with the tournament server 260. While a game application 230 is running a match (e.g., a game instance), the game application 230 has an internal game state that changes over time as the associated player 210 interacts with (e.g., plays) the game. Peer-tournament module 240 can capture the game state data periodically, and/or continuously and transmit the captured game state to the tournament server 260. The game state data can include user action data including a characterization of user input into an interface such as key-presses, mouse/joystick/direction-pad inputs, and the like. The tournament server 260 can receive the game state from multiple peer-tournament modules 240. The matches may be separate in that they do not share a game state. For example, each game application 230 can be an asynchronous single player game. In some implementations, the matches share a game state (e.g., multiple players interact within one game environment).

In some implementations, the peer-tournament module 240 and the tournament server 260 does not provide game data to the game application $230_i$. In other words, in some implementations, they do not contribute to implementing a game instance but rather observe the game, capture a game state, and enable a separate layer of multi-match tournament functionality.

When the game being played (e.g., the game instances $230_i$) are asynchronous, the game server 250 and/or game instances $230_i$ do not have an underlying mechanism for initiating gameplay at the same time. In order to enable live tournaments such that players simultaneously compete using asynchronous games, the current subject matter can include synchronizing the start of multiple asynchronous games. This can allow live tournaments as well as enable direct comparison of gameplay (e.g., by a commentator streaming a comparison of two video feeds). In some implementations, tournament server 260 and peer-tournament modules $240_i$ can enable synchronous initiation of gameplay.

Figure 6:
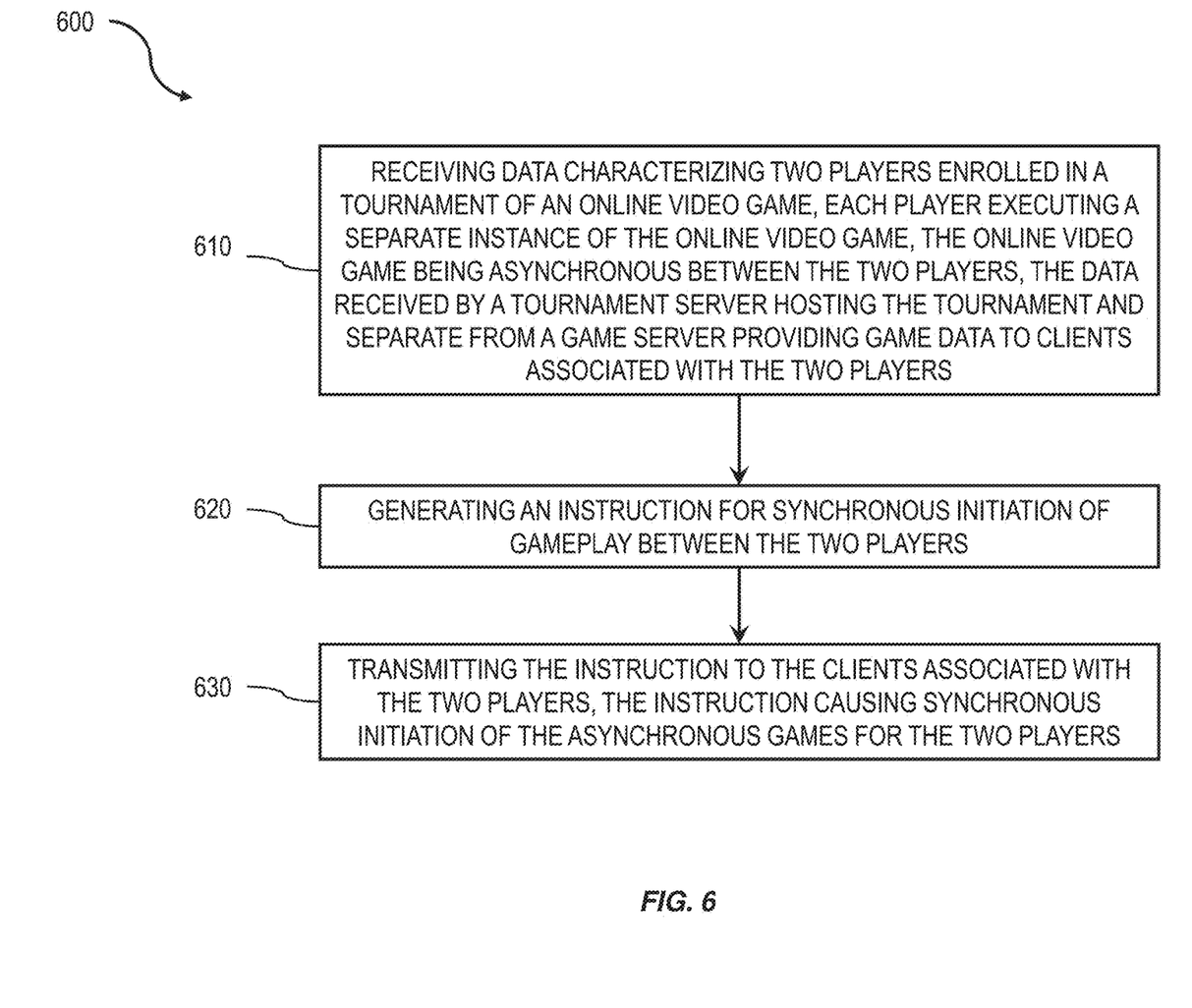
FIG. 6 is a process flow diagram illustrating a method of synchronizing initiation of gameplay for asynchronous game instances.

FIG. 6 is a process flow diagram illustrating a method 600 of synchronizing initiation of gameplay for asynchronous game instances. The tournament can be implemented by a tournament server 260 hosting the tournament and separate from game server 250, which can provide the game data to clients associated with each player.

At 610, data can be received that characterizes two players enrolled in a tournament of an online video game. A player can be enrolled once the tournament server receives a request from the associated client that the player wishes to participate in a tournament.

At 620, an instruction for synchronous initiation of gameplay between the two players can be generated. The instruction can be generated once all player clients needed for a tournament match have enrolled and accepted a handshake from the tournament server 260.

At 630, the instruction is transmitted to the player clients. The instruction causes synchronous initiation of the asynchronous games for the player clients. A match can be considered to by synchronized when both clients initiate gameplay at a similar time, which may be within 10, 5, 2, 1, 0.1 seconds, or less.

In some implementations, the instruction causes gameplay to initiate when received by the client. The peer-tournament module $240_i$ can receive the instruction and execute a launch-game callback with the game instance $230_i$. A callback can include executable code that is passed as an argument to other code (in this case the game instance $230_i$), which is expected to call back (execute) the argument at a given time. This execution may be immediate as in a synchronous callback, or it might happen at a later time as in an asynchronous callback.

In some implementations, the peer-tournament module $240_i$ can transmit another instruction to the game server 250 to cause initiation of communication of game data from the game server 250 to the respective game instance $230_i$. This second instruction can be sent in response to receiving the first instruction from the tournament server 260.

In some implementations, the instruction specifies a time for game initiation. For example, the instruction may specify that each game instance 230, should begin gameplay at 9:00.00 o'clock. In some implementations, a peer-tournament module $240_i$ can receive the instruction and causes the game to initiate at the specified time by executing a launch-game callback with the game instance either at the specified time or with an instruction to launch at the specified time.

In some implementations, the peer-tournament module $240_i$ can transmit another instruction to the game server 250 to cause initiation of communication of game data from the game server 250 to the respective game instance $230_i$. This second instruction can be transmitted at the specified time or with an instruction to begin communication at the specified time.

Figure 7:
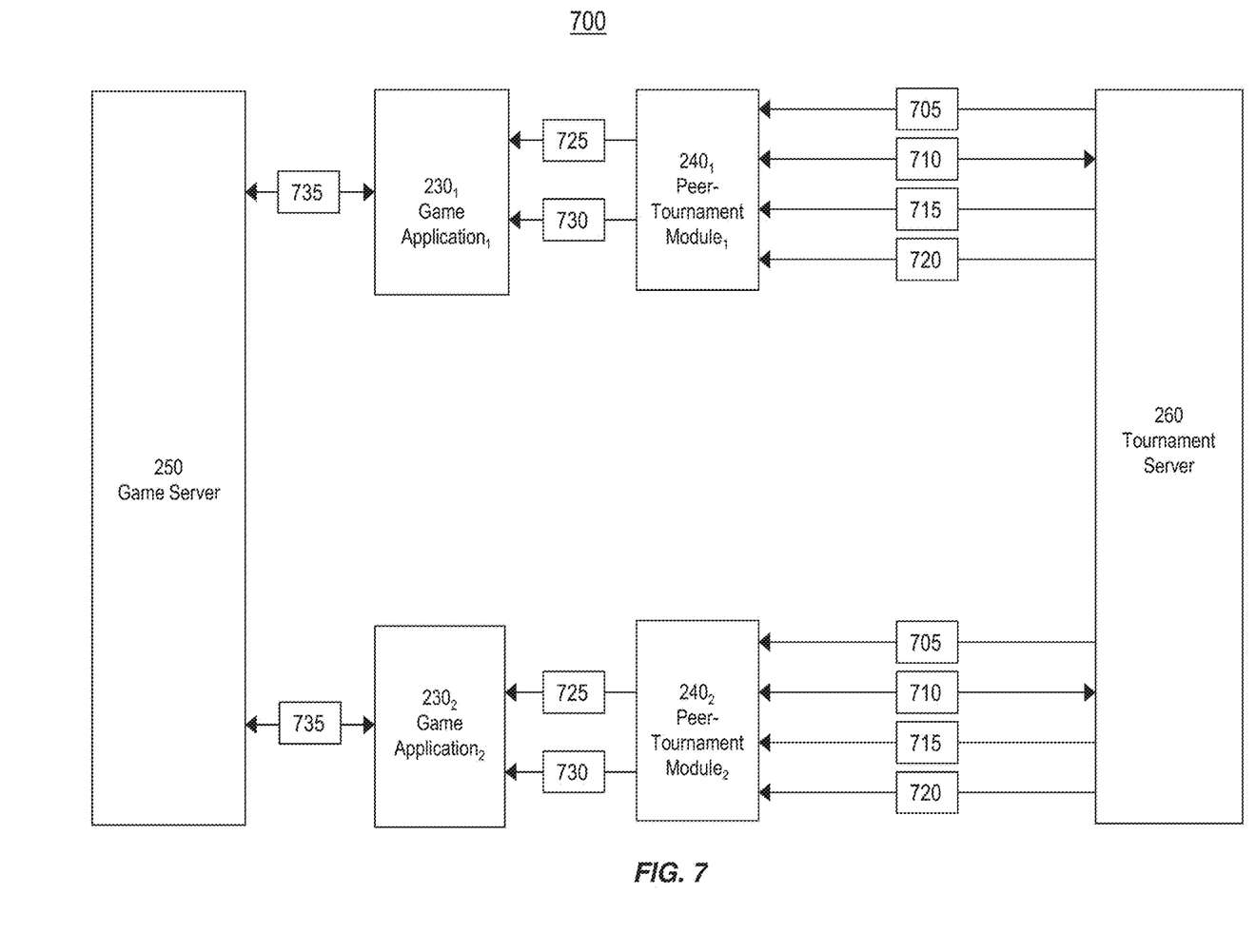
FIG. 7 is a data flow diagram illustrating data flow between components of the peer-tournament system.

FIG. 7 is a data flow diagram illustrating data flow between components of the peer-tournament system 200. The illustrated system includes two players, each having a respective game instance ($230_1$ and $230_2$) and a peer-tournament module ($240_1$ and $240_2$). While only two players are illustrated, it is understood that more than two players are possible.

At 705, each peer-tournament module ($240_1$ and $240_2$) sends a request to join a tournament. The players can then be considered to be enrolled in the tournament. Players can join a lobby until there is an appropriate match. The tournament server 260 can determine when and who to match.

For example, Player 1 attempts to join match by, for example, notifying tournament server 260 via an application programming interface (API) call. The tournament server 260 begins attempting to find a match. Likewise, Player 2 can attempt to join a match by, for example, notifying tournament server via an API call. In some implementations, while a player waits, user interface control of their client can be passed to their respective game instance ($230_1$ and $230_2$) so the game instance ($230_1$ and $230_2$) can display its own user interface for the matching period. The tournament server 260 determines that player 1 and player 2 can be matched together. The matching process can depend on a number of factors, for example, relative skill and/or experience levels in the current or other games.

The first player can be considered the host and can initiate the first turn. In some implementations, peer-tournament module $240_i$ can pass authentication tokens to the tournament server 260, so the tournament server can confirm the validity of a join request.

At 710, the tournament server 260 and each peer-tournament module ($240_1$ and $240_2$) can perform a handshake to finalize the join process. The handshake process can handle cases where a player has begun matching, but leaves before they are matched. Prior to initiating a match, the tournament server 260 confirm with the peer-tournament module $240_i$ that all players are still waiting to play. If the peer-tournament module $240_i$ does not respond, the tournament server 260 can return to matching the player that did respond.

At 715, a synchronization instruction can be generated and transmitted from the tournament server 260 to each peer-tournament module ($240_1$ and $240_2$). The synchronization instruction can be generated and transmitted in response to a successful match process. In addition, the tournament server 260 can deduct an entry fee from accounts associated with each player.

At 720, the tournament server 260 can also transmit data including a match identifier (ID), a player ID, and game parameters. If a peer-tournament module ($240_1$ and $240_2$) still has user interface control, then that control can be passed to the respective game instance ($230_1$ and $230_2$). The match ID can include a unique ID for a given specific instance of a tournament (e.g., a numeric identifier). The player ID can include a unique ID for a user's entry in a tournament (e.g., a numeric ID). Game parameters can include any information to configure each game instance for execution/starting gameplay. For example, game parameters can include a time limit, level, and level abilities (e.g., timeLimit=3, arena=random, level abilities=disable). The match ID and game parameters transmitted can be the same for each player while the player IDs can be different.

At 725, the game parameters can be passed to the respective game instance ($230_1$ and $230_2$) from the respective peer-tournament module ($240_1$ and $240_2$).

At 730, each peer-tournament module ($240_1$ and $240_2$) can cause initiation of gameplay by the game instance ($230_1$ and $230_2$). This can be performed, for example, by executing a callback or other API call. In some instances, the callback can be executed using the game parameters.

At 735, normal gameplay proceeds simultaneously between each game instance ($230_1$ and $230_2$) and the game server 250.

In some implementations, players wait for a match (e.g., in a lobby) for only a limited amount of time before declaring a failure to match. In some implementations, the peer-tournament module $240_i$ can wait a specified amount of time, after which is then displays an error and either exits the lobby or allows the player to continue waiting. In some implementations, a tournament creator or host can specify the maximum allowed wait time.

In some implementations, player client connection information is stored by the tournament server 260. This can enable a reconnection by a client that is disconnected. The connection information can include an API key, an internet protocol (IP) address and/or domain name, and a port for connecting. The existing match identity and tournament player identity can be used for identifying the player (during reconnect) and connecting them for individual matches via the tournament server 260.

In some implementations, tournament server 260 can provide: tournament management in a developer portal, player matching, payment processing and user balance management, video streaming, cheat/fraud detection, and game analytics.

In some implementations, intra-game score and final score reporting occurs according to the game's normal process.

In some implementations, the tournament server can generate one or more random numbers and/or number seeds and send or stream the same numbers and/or seeds to all participating clients for use in executing the game instances. By causing each game instance to use the same random numbers, fairness between game instances can be enhanced.

Figure 3:
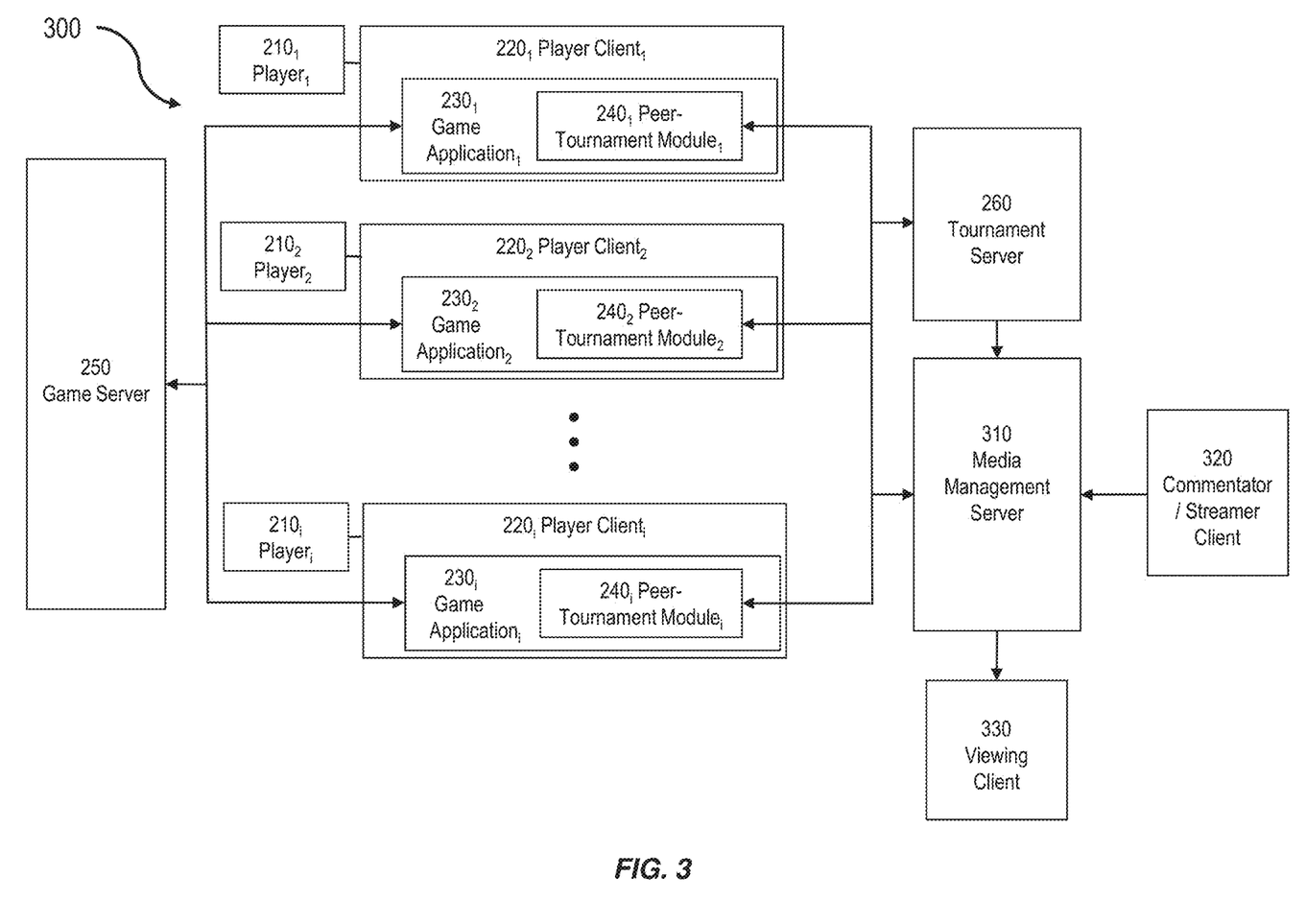
FIG. 3 is a system block diagram of a system with an example media management server enabling video streaming of a tournament.

FIG. 3 is a system block diagram of a system 300 with an example media management server 310 enabling video streaming of a tournament. The example system 300 includes the components as described above with reference to FIG. 2 and further includes a media management server 310. Media management server 310 interfaces with a tournament commentator 320, which can be the tournament host, participant, or third party (also referred to as a streamer 320). Commentator 320 can be a client device. Media management server 310 can provide an automated virtual broadcast studio for tournament commentator 320 to cover, for example, an eSports tournament. Media management server 310 receives video streams from clients and/or game state data from tournament server 260 and can allow a commentator to generate unique content related to the tournament. The commentator video stream can be provided to viewing clients 330 and/or players 210 and/or used to assemble a suggested broadcast for the tournament commentator 320. Media management server 310 can broadcast a live video feed (as controlled by tournament commentator 320) to players 210 and/or viewing clients 330.

Figure 5:
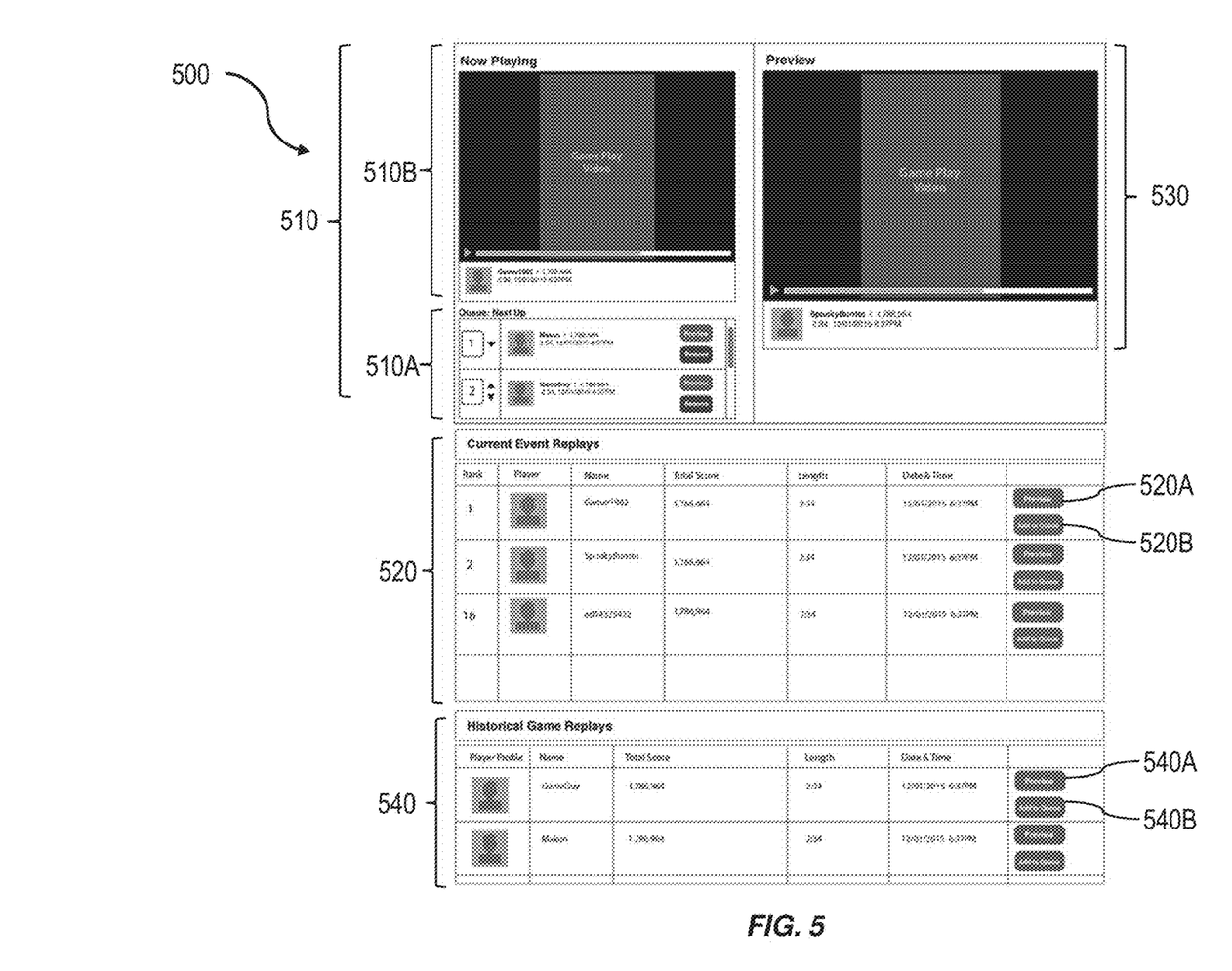
FIG. 5 is an example graphical user interface (GUI) of an event streaming video control and display.

FIG. 5 is an example graphical user interface (GUI) 500 of an event streaming video control and display. The event streaming video controls and display 500 includes an interface to a tool that provides the streamer with the ability to present the tournament efficiently and in an engaging manner. The video controls are available in a web browser and can provide the streamer with the following capabilities: automatically show replays of top performing competitors; select and stream gameplay of individual competitors based upon; player seed; round; matches that have gone into a tiebreaker; whether or not the player's opponent has finished; sort video play order by round and/or seed; and display video replays of multiple players side-by-side for real time comparison.

The video control panel 500 includes a video queue interface 510 for streamers 320 to view, select, and play videos or clips. The video queue interface 510 allows the streamer to interact with and control what is being broadcasted to his or her stream. The video queue interface 510 includes two components: a now playing stream 510B, and a queue 510A.

The now playing stream 510B shows the streamer 320 what replay is being currently broadcasted (e.g., the live video stream or feed). This is a persistent space that allows the streamer 320 to monitor what they are currently sharing even while using the window to preview streams or adjust replays in a way that will not be shared with the audience.

The queue 510A gives the streamer 320 the capability to control the order that video portions or replays will be shown. The streamer 320 may add individual video portions that they would like to show next, or change the order of what videos are up next to be broadcasted. If the streamer 320 chooses not to add anything to the queue, or if the queue becomes empty, the system can automatically stream video of one of players using the across-match comparison, for example, by streaming video of one of the top three performing players 210, the video of the player 210 having the greatest change in score over a one minute period of time, and the like.

Video control panel 500 includes a list of players 520 participating in tournament matches and for which video capture is available for broadcast to a wider audience. The list of players 520 includes options to preview 520A or add 520B their replay to the queue 510A. Video control panel 500 further includes a preview space 530 for viewing video and a list of historical game replays 540 with options to preview 540A or add 540B the historical game replay to the queue 510A.

In some implementations, media management server 310 automatically breaks down video captured at the player clients 220 into highlight reels and key segments, and assembles a suggested broadcast for the streamer 320. Thus media management server 310 enables automated functionality that acts as the streamer's 320 own "behind the scenes analyst team." This allows the streamer 320 to work as a one person team and easily select the correct footage to play without having to take breaks from the live stream to look up past footage or stats. Automatic analytics and features include the rank ordering of replays that causes replays and player lists to appear in the queue 510A in order of their current rank in the tournament. This makes it easy to find the replay for any player based upon where they stand. Prior to watching the video the streamer can know what level of player they are selecting and what the outcome of their game might be.

Although a few variations have been described in detail above, other modifications or additions are possible.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other. The programmable system or computing system can include mobile devices such as tablets, phones, laptops, gaming platforms, and other like devices.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of or "one or more of may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

receiving, by a tournament server, data characterizing a first player enrolled in a tournament of an online video game and a first client associated with the first player, the first client executing a first game instance having a first game state;

receiving, by the tournament server, data characterizing a second player enrolled in the tournament and a second client associated with the second player, the second client executing a second game instance have a second game state, the first game state different from the second game state, the tournament server separate and independent from a game server providing first game data to the first client during gameplay, the game server providing second game data to the second client during gameplay, the online video game being asynchronous between the first client and the second client;

generating, by the tournament server, an instruction for synchronous initiation of gameplay between the first client and the second client;

transmitting the instruction to the first client and to the second client, the instruction causing synchronous initiation of gameplay of the first game instance and the second game instance, wherein the game server, the first game instance, and the second game instance lack a mechanism for initiating gameplay at the same time; and providing, from a commentator client and to a viewing client, simultaneous gameplay of the first game instance and the second game instance for side-by-side viewing by the viewing client, the providing comprising:

receiving, from the tournament server and at a media management server operatively coupled to the tournament server, a first video stream and a second video stream, the first video stream and the second video stream synchronized in response to the transmission of the instruction, the first video stream comprising captured video of the gameplay of the first game instance, and the second video stream comprising captured video of the gameplay of the second game instance;

generating, from the first video stream and the second video stream and in response to an input from a commentator client operatively coupled to the tournament server, a comparison feed comprising the first video stream and the second video stream displayed side-by-side;

providing, by the media management server, the comparison feed to the viewing client;

selecting, by the media management server, a first video segment from the first video stream and a second video segment from the second video stream;

assembling, by the media management server, a suggested broadcast for the commentator client, the suggested broadcast comprising at least the first video segment and the second video segment;

transmitting the suggested broadcast to the commentator client;

selecting, at the commentator client and by an interface of the commentator client, a key segment, the key segment comprising at least a portion of the suggested broadcast; and providing, by the media management server, the key segment to the viewing client.

2. The method of claim 1, wherein the instruction causes gameplay to initiate when received by the first client and the second client.

3. The method of claim 2, wherein the first client includes a peer-tournament module that receives the instruction and causes gameplay to initiate in response to receiving the instruction by executing a launch-game callback with the first game instance.

4. The method of claim 2, wherein the first client includes a peer-tournament module that receives the instruction and, in response to receiving the instruction, transmits a second instruction to the game server to cause initiation of communication of game data from the game server to the first game instance.

5. The method of claim 1, wherein the instruction specifies a time for game initiation.

6. The method of claim 5, wherein the first client includes a peer-to-peer module that receives the instruction and causes the game to initiate at the specified time by executing a launch-game callback with the first game instance.

7. The method of claim 5, wherein the first client includes a peer-to-peer module that receives the instruction and, at the specified time to initiate, transmits a second instruction to the game server to cause initiation of communication of game data from the game server to the first game instance.

8. The method of claim 1, further comprising:

transmitting, to each client, a match identifier, a player identifier, and game parameters, wherein the match identifier specifies a unique identifier to the tournament, the player identifier is a unique identifier for a user's entry in the tournament, and the game parameters include data for configuring each game instance to execute.

9. The method of claim 1, further comprising:

generating, by the commentator client, a graphical user interface including a video queue interface for a commentator to view, select, and play the first video stream and/or the second video stream.

10. A system comprising:

at least one data processor;

memory storing instructions which, when executed by the at least one data processor, causes the at least one data processor to implement a method comprising:

receiving, by a tournament server, data characterizing a first player enrolled in a tournament of an online video game and a first client associated with the first player, the first client executing a first game instance having a first game state;

receiving, by the tournament server, data characterizing a second player enrolled in the tournament and a second client associated with the second player, the second client executing a second game instance have a second game state, the first game state different from the second game state, the tournament server separate and independent from a game server providing first game data to the first client during gameplay, the game server providing second game data to the second client during gameplay, the online video game being asynchronous between the first client and the second client;

generating, by the tournament server, an instruction for synchronous initiation of gameplay between the first client and the second client;

transmitting the instruction to the first client and to the second client, the instruction causing synchronous initiation of gameplay of the first game instance and the second game instance, wherein the game server, the first game instance, and the second game instance lack a mechanism for initiating gameplay at the same time; and providing, from a commentator client and to a viewing client, simultaneous gameplay of the first game instance and the second game instance for side-by-side viewing by the viewing client, the providing comprising:

receiving, from the tournament server and at a media management server operatively coupled to the tournament server, a first video stream and a second video stream, the first video stream and the second video stream synchronized in response to the transmission of the instruction, the first video stream comprising captured video of the gameplay of the first game instance, and the second video stream comprising captured video of the gameplay of the second game instance;

generating, from the first video stream and the second video stream and in response to an input from a commentator client operatively coupled to the tournament server, a comparison feed comprising the first video stream and the second video stream displayed side-by-side;

providing, by the media management server, the comparison feed to the viewing client;

selecting, by the media management server, a first video segment from the first video stream and a second video segment from the second video stream;

assembling, by the media management server, a suggested broadcast for the commentator client, the suggested broadcast comprising at least the first video segment and the second video segment;

transmitting the suggested broadcast to the commentator client;

selecting, at the commentator client and by an interface of the commentator client, a key segment, the key segment comprising at least a portion of the suggested broadcast; and     providing, by the media management server, the key segment to the viewing client.

11. The system of claim 10, wherein the instruction causes gameplay to initiate when received by the first client and the second client.

12. The system of claim 11, wherein the first client includes a peer-tournament module that receives the instruction and causes gameplay to initiate in response to receiving the instruction by executing a launch-game callback with the first game instance.

13. The system of claim 10, wherein the first client includes a peer-tournament module that receives the instruction and, in response to receiving the instruction, transmits a second instruction to the game server to cause initiation of communication of game data from the game server to the first game instance.

14. The system of claim 10, wherein the instruction specifies a time for game initiation.

15. The system of claim 14, wherein the first client includes a peer-to-peer module that receives the instruction and causes the game to initiate at the specified time by executing a launch-game callback with the first game instance.

16. The system of claim 14, wherein the first client includes a peer-to-peer module that receives the instruction and, at the specified time to initiate, transmits a second instruction to the game server to cause initiation of communication of game data from the game server to the first game instance.

17. The system of claim 10, further comprising:

transmitting, to each client, a match identifier, a player identifier, and game parameters, wherein the match identifier specifies a unique identifier to the tournament, the player identifier is a unique identifier for a user's entry in the tournament, and the game parameters include data for configuring each game instance to execute.

18. A non-transitory computer program product storing instructions, which when executed by at least one data processor of at least one computing system, implement a method comprising:

receiving, by a tournament server, data characterizing a first player enrolled in a tournament of an online video game and a first client associated with the first player, the first client executing a first game instance having a first game state;

receiving, by the tournament server, data characterizing a second player enrolled in the tournament and a second client associated with the second player, the second client executing a second game instance have a second game state, the first game state different from the second game state, the tournament server separate and independent from a game server providing first game data to the first client during gameplay, the game server providing second game data to the second client during gameplay, the online video game being asynchronous between the first client and the second client; generating by the tournament server, an instruction for synchronous initiation of gameplay between the first client and the second client;

transmitting the instruction to the first client and to the second client, the instruction causing synchronous initiation of gameplay of the first game instance and the second game instance, wherein the game server, the first game instance, and the second game instance lack a mechanism for initiating gameplay at the same time; and providing, from a commentator client and to a viewing client, simultaneous gameplay of the first game instance and the second game instance for side-by-side viewing by the viewing client, the providing comprising:

receiving, from the tournament server and at a media management server operatively coupled to the tournament server, a first video stream and a second video stream, the first video stream and the second video stream synchronized in response to the transmission of the instruction, the first video stream comprising captured video of the gameplay of the first game instance, and the second video stream comprising captured video of the gameplay of the second game instance;

generating, from the first video stream and the second video stream and in response to an input from a commentator client operatively coupled to the tournament server, a comparison feed comprising the first video stream and the second video stream displayed side-by-side;

providing, by the media management server, the comparison feed to the viewing client;

selecting, by the media management server, a first video segment from the first video stream and a second video segment from the second video stream;

assembling, by the media management server, a suggested broadcast for the commentator client, the suggested broadcast comprising at least the first video segment and the second video segment;

transmitting the suggested broadcast to the commentator client;

selecting, at the commentator client and by an interface of the commentator client, a key segment, the key segment comprising at least a portion of the suggested broadcast; and providing, by the media management server, the key segment to the viewing client.

19. The computer program product of claim 18, wherein the instruction causes gameplay to initiate when received by the first client and the second client; and wherein the first client includes a peer-tournament module that receives the instruction and causes gameplay to initiate in response to receiving the instruction by executing a launch-game callback with the first game instance.

20. The computer program product of claim 18, wherein the instruction causes gameplay to initiate when received by the first client and the second client; and wherein the first client includes a peer-tournament module that receives the instruction and, in response to receiving the instruction, transmits a second instruction to the game server to cause initiation of communication of game data from the game server to the first game instance.

21. A method comprising:

receiving, by a tournament server, data characterizing a first player enrolled in a tournament of an online video game and a first client associated with the first player, the first client executing a first game instance having a first game state;

receiving, by the tournament server, data characterizing a second player enrolled in the tournament and a second client associated with the second player, the second client executing a second game instance have a second game state, the first game state different from the second game state, the tournament server separate and independent from a game server providing first game data to the first client during gameplay, the game server providing second game data to the second client during gameplay, the online video game being asynchronous between the first client and the second client;

generating, by the tournament server, an instruction for synchronous initiation of gameplay between the first client and the second client;

transmitting the instruction to the first client and to the second client, the instruction causing synchronous initiation of gameplay of the first game instance and the second game instance;

receiving, by a media management server and from the tournament server, a first video stream from the first client and a second video stream from the second client, the first video stream and the second video stream synchronized in response to the transmission of the instruction, the first video stream comprising captured video of the gameplay of the first game instance, and the second video stream comprising captured video of the gameplay of the second game instance;

generating, by a commentator client, a graphical user interface including a video queue interface for a commentator to view, select, and play the first video stream and/or the second video stream; and providing, from the commentator client and to a viewing client, simultaneous gameplay of the first game instance and the second game instance for side-by-side viewing by the viewing client, the providing comprising:

generating, from the first video stream and the second video stream and in response to an input from the commentator client, a comparison feed comprising the first video stream and the second video stream displayed side-by-side;

providing, by the media management server, the comparison feed to the viewing client;

selecting, by the media management server, a first video segment from the first video stream and a second video segment from the second video stream;

assembling, by the media management server, a suggested broadcast for the commentator client, the suggested broadcast comprising at least the first video segment and the second video segment;

transmitting the suggested broadcast to the commentator client;

selecting, at the commentator client and by the graphical user interface, a key segment, the key segment comprising at least a portion of the suggested broadcast; and providing, by the media management server, the key segment to the viewing client, wherein the first client includes a first peer-tournament module that receives the instruction, the second client includes a second peer-tournament module receives the instruction;

wherein the first peer-tournament module causes gameplay to initiate in response to receiving the instruction by at least:

executing a first launch-game callback with the first game instance, or transmitting a second instruction to the game server to cause initiation of communication of game data from the game server to the first game instance;

wherein the second peer-tournament module causes gameplay to initiate in response to receiving the instruction by at least:

executing a second launch-game callback with the second game instance, or transmitting a third instruction to the game server to cause initiation of communication of game data from the game server to the second game instance, wherein the game server, the first game instance, and the second game instance lack a mechanism for initiating gameplay at the same time.

22. The method of claim 21, further comprising streaming the gameplay based at least one of the following: player seed, round, player rank, matches that have gone into a tiebreaker, and whether or not an opponent of either the first player or the second player has finished the opponent's game instance.

* * * * *